Dec. 1, 1925.  H. D. SAWKINS  1,563,661
PEANUT DRYING AND ROASTING APPARATUS
Filed May 20, 1925   4 Sheets-Sheet 1

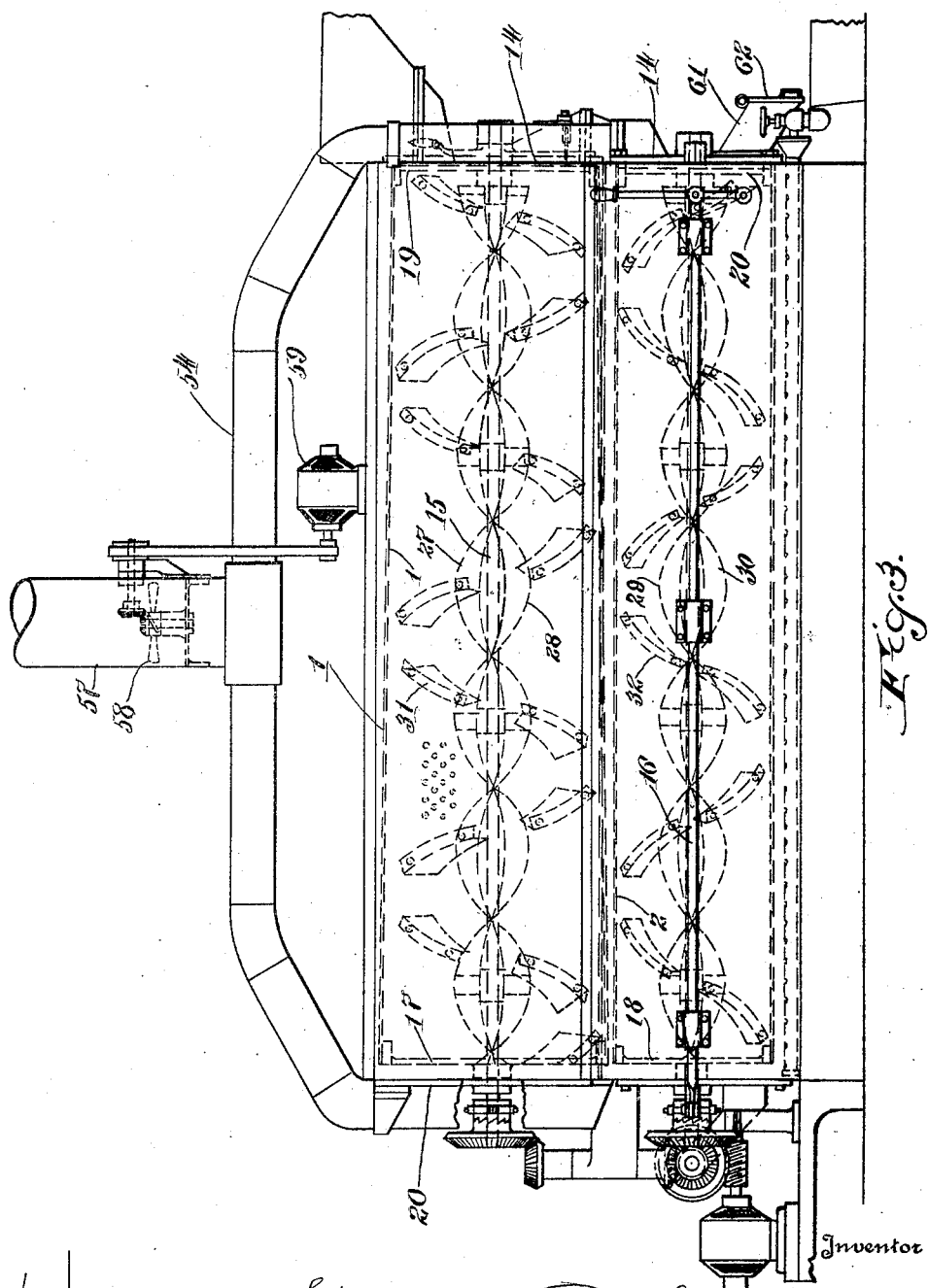

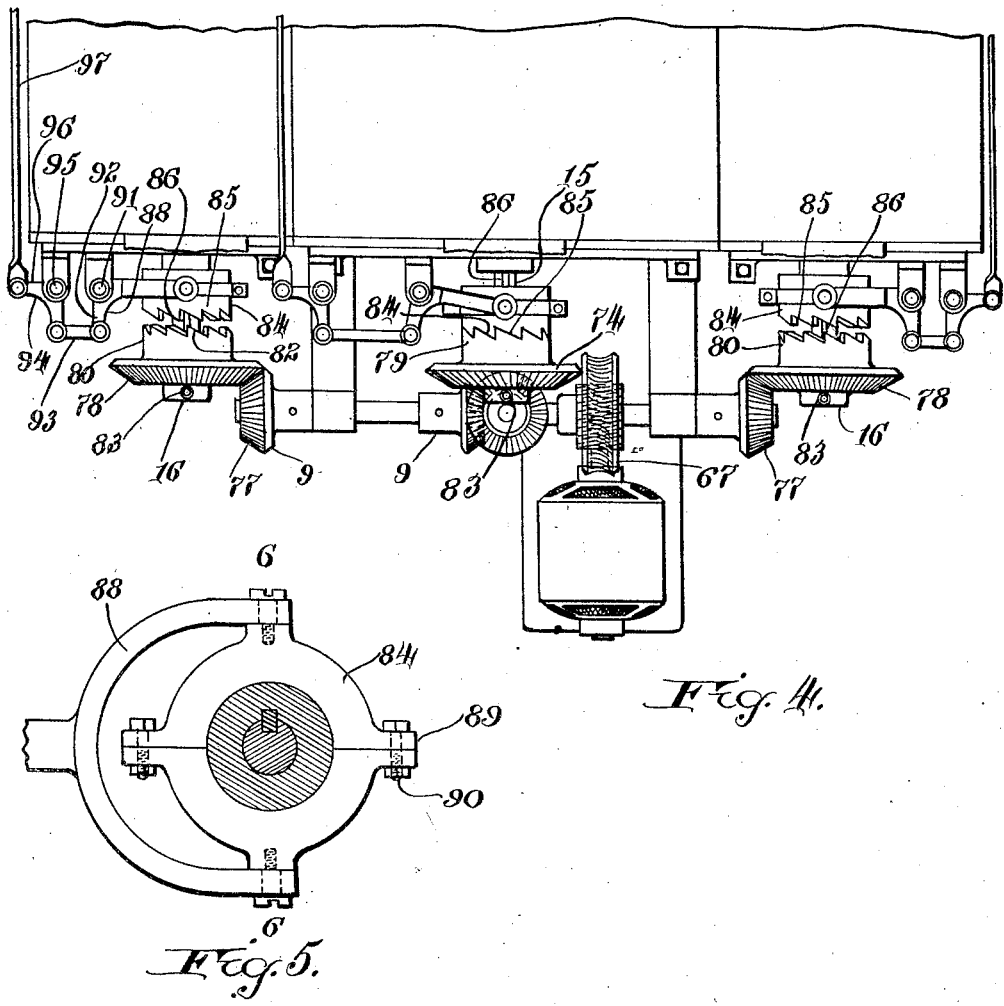

Patented Dec. 1, 1925.

1,563,661

UNITED STATES PATENT OFFICE.

HUNTINGTON D. SAWKINS, OF BALTIMORE, MARYLAND.

PEANUT DRYING AND ROASTING APPARATUS.

Application filed May 20, 1925. Serial No. 31,487.

*To all whom it may concern:*

Be it known that I, HUNTINGTON D. SAWKINS, a citizen of the United States of America, residing in the city of Baltimore, State of Maryland, have invented certain new and useful Improvements in Peanut Drying and Roasting Apparatus, of which the following is a specification.

In the production of salted peanuts which are salted in the shell, the peanuts with the shell on are first impregnated with brine and then dried and roasted.

The present invention relates to an apparatus for drying and roasting peanuts which have been thus impregnated and removed from the brine, the method of treatment in and with the brine being described in my patent entitled "Method of salting peanuts," No. 1,505,605, granted August 19, 1924.

When the peanuts are first removed from the salting or impregnating apparatus, they still carry a considerable amount of liquid which cannot be separated from them otherwise than by evaporation, and the mass of peanuts still carries some liquid brine which if evaporated in the roaster produces a coating of salt on the inside of the roaster and otherwise interferes with and prolongs or retards the roasting process. Therefore it is found desirable to first put the peanuts through an agitating and drying process whereby all external traces of brine are removed, and then to roast them, and as the drying requires much less heat than the roasting process, a considerable degree of economy is practiced by carrying on the roasting and the drying operations simultaneously, using the waste heat from the roasting in the drying operation, and as it is more difficult to treat the product in bulk during the roasting process than during the drying process, the roasting units have been made smaller than the drying units, and the apparatus comprises twice as many roasting units as drying units. In the present instance there is a single drier and two roasters, the capacity of the drier being equal to the total capacity of the roasting units, the waste heat from the two roasters being led into contact with the single drier. In the drying and roasting operations the wet peanuts from the brine, the brine being preferably partially removed therefrom, are placed in the drying cylinder, rotated and agitated while receiving the waste heat from the roasters. After being thus treated for a period of forty minutes, the agitation is discontinued and the dried peanuts are led down into the roasters, half being led into one roaster and half into the other roaster. The drying unit is then again filled and the roasting and drying operation are continued simultaneously, the roasting operation consisting mainly in heating and agitating the peanuts, and leading off the dust which is formed during this process. Considerable quantities of salt are also deposited on the walls of the drier. These are removed by beating the drier at intervals.

The apparatus in the preferred form as illustrated, consists of a rotary drying cylinder and two rotary roasting cylinders suitably enclosed to prevent the loss of heat, the drying cylinder being above the roasting cylinders, which in the form shown are spaced apart, the drying cylinder being shown as directly over the space between the two roasting cylinders. All three cylinders are equipped with suitable agitating means to give uniform treatment of the peanuts, and the roasting cylinders are heated by gas burners or other suitable means. The apparatus also includes a motor with connections, including drive shaft, gears, and means for connecting and disconnecting each individual cylinder from the driving means.

In the accompanying drawing I have illustrated a drying and roasting apparatus embodying my invention in the preferred form.

In the drawing—

Figure 3 is a side elevation taken from the left in Figure 1.

Figure 4 is a plan of the rear end broken away, the feature mainly illustrated being the shafts and gearings which rotate the cylinder.

Figure 5 is a detailed view of any one of the clutches; and

Figure 1:
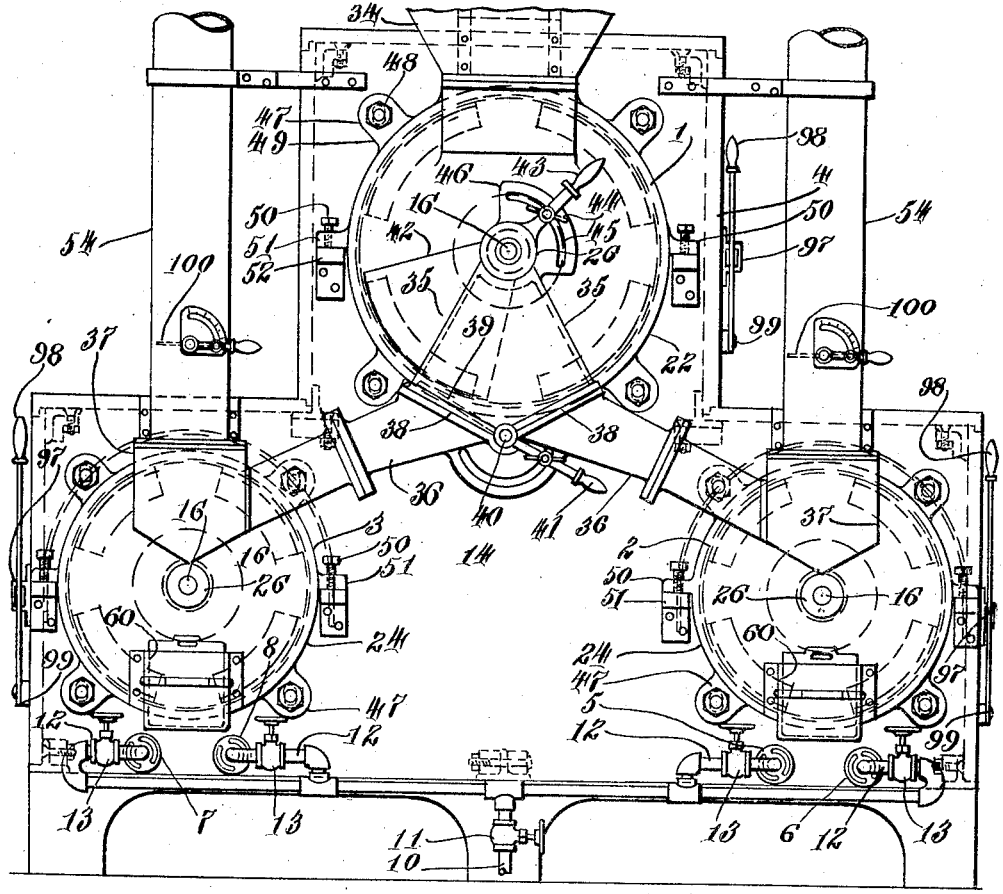
Figure 1 is a front elevation of the apparatus.
Figure 6:
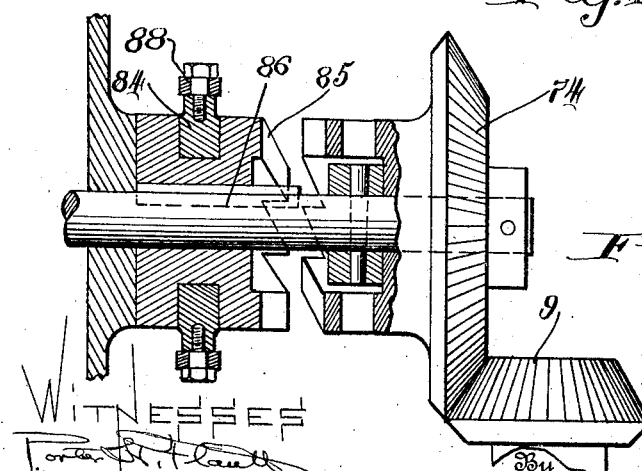
Figure 6 is a sectional elevation of the same on the line 6, 6, Figure 5.

Referring to the drawing by numerals, each of which is used to indicate the same or similar parts in the different figures, the apparatus as shown consists of a drying cylinder 1, and two roasting cylinders 2, 3 mounted within a suitable enclosure or furnace 4. The apparatus also includes burners 5, 6, 7 and 8, shown as of the well-known Bunsen type, and suitable shafting and gearing 9 to rotate the cylinders.

In the form of the invention shown, the cylinders 1, 2 and 3 are parallel, the roasting cylinders 2 and 3 being together of capacity equal to the drier cylinder 1, and the cylinders 2 and 3 being lower down than the cylinder 1, and spaced apart, the cylinder 1 being, as shown, and preferably, over the space between the cylinders 2 and 3.

The casing 4 is, as shown, of a cross-section resembling an inverted T, the roasting cylinders 2 and 3 being in the ends of the arms of the T and the drier cylinder 1 being in the central leg of the T. The burners 5, 6, 7 and 8 are elongated and parallel to the axes of the cylinders, the burners 5 and 6 being beneath the cylinder 2, one on each side of the centre, and the burners 7, 8 beneath the cylinder 3 and likewise spaced on each side of the centre.

As shown, gas is supplied by way of a pipe 10 controlled by a valve 11 and having branch pipes 12 leading to each of the respective burners, each of said burners being controlled by a valve 13 in the particular branch pipe which feeds the burner.

The cylinders are preferably each in the form of an elongated tubular member mounted on its respective central shaft, the drier cylinder shaft being indicated by reference character 15, and the roaster cylinder shafts each by reference character 16. These tubular members are closed at the rear by an end plate or wall 17 in the drier cylinder and 18 in each of the roaster cylinders, the front end of each cylinder being mounted on a spider 19 in the drier cylinder and 20 in the roaster cylinders, the spider being secured at the centre to the corresponding shaft. The front end of each cylinder is closed by the front wall 14 of the furnace with which it is in close contact, and the furnace is provided in the preferred form as shown with circular openings 21 at the front and rear opposite and corresponding to the respective cylinders 1, 2 and 3, and slightly larger than the cylinders, each respective opening being covered by a circular cover plate 22 at the front, covering the front of the drier cylinder and 23 at the rear registering with the rear of the drier cylinder. There are also circular plates 24, 24 at the front, covering the respective roasting cylinder openings 21 at the front and 25, 25 at the rear, registering with the respective roasting cylinders at the rear. These plates 22, 23, 24, 25 are held in place by nuts and bolts 48, 49 engaging ears 47, and the plates carry the bearings 26 for the respective ends of the shafts 15 and 16, 16. Each of the shafts 15, 16 is provided inside its respective cylinder with oppositely disposed helical or other suitable paddles 27, 28, 29, 30, and the cylinders are provided on their internal faces with projecting helical or other inclined ribs or beaters 31, 32, the paddles or ribs or beaters being provided and devised to give motion to the product as it is dried and roasted, to prevent sticking and burning and to give uniformity of treatment.

The cover plate 22 at the front is provided with a hopper opening or feed member 34 near the top centre into which the wet salted peanuts are fed in the first instance, and this front plate is also provided with a downwardly disposed outlet passage 35 in the form of a fan-shaped projection which radiates downwardly from the bearing member 26 at the centre, from the bottom of which projection roaster feed pipes 36, 36 lead downward and laterally to the front plates 24 of the roaster cylinders, which front plates are provided with projections 37 to which the pipes 36 are connected and which projections enclose suitable feed openings in the front plates 24. The openings 38 to the pipes 36 are closed alternately by a damper 39 pivoted at 40 intermediately of the two openings and actuated by a handle 41 on the opposite side of the pivot to the damper, and the passage 35 is further controlled by an arcuate valve member 42 pivotally mounted on the shaft 16 of the drier cylinder and controlled by a handle 43 integral with the valve member and projecting therefrom on the opposite side of the shaft, which handle 43 may be clamped by means of a thumb-screw 44 sliding in an arcuate slot 45 in a projecting portion 46 of the cover plate 22.

As stated, the cover plates 22, 23, 24, 25 are held in position by ears 47 projecting radially from the plates and engaged by nuts and bolts 48, the bolts being passed through or seated in the wall of the furnace. The bolts 48 may, if desired, be seated in elongated slots 49 in the furnace wall and the cover plates may be adjusted to align the bearings and for other purposes by means of set screws 50 passed through ears 51 on each side of the plates, the set-screws engaging suitable blocks or brackets 52 secured to the furnace wall.

Figure 2:
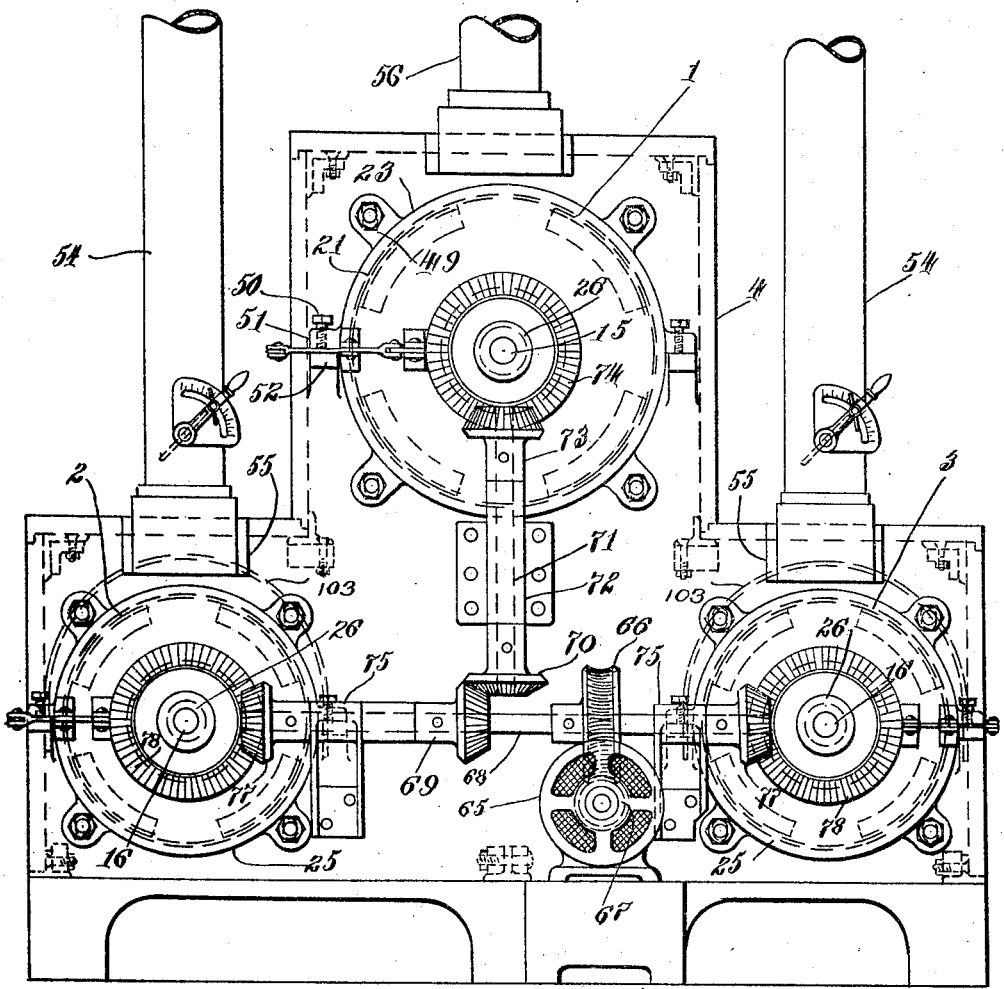
Figure 2 is a corresponding rear elevation of the same.

The projections 37 at the front of the roasters in addition to their connection to the feed pipe 36 which lead by way of these projections into the respective roaster cylinders, are also connected to vent pipes 54 which are also connected to the rear of the furnace at 55 near the top of each roaster, the vent pipes 54 being passed over the top of the furnace or otherwise formed in a U connected to the front and rear as shown in Figure 3, and the furnace is provided with still another vent pipe 56 leading out of the furnace just over the drier cylinder at the front, all of which pipes 54 and 56 are connected to a single riser or stack 57 shown in Figure 3 near the centre and which may be provided with a fan 58 driven by a belt from a motor 59, or in any suitable manner from any convenient source of power. The front cover plates 24 of the roasters are also provided with delivery openings 60 which may be connected to delivery pipes 61, Figure 3, leading downwardly and forwardly, so as to drop the product in any suitable receptacle, the pipes 61 being preferably closed by delivery doors 62. The cylinders 2—2 are preferably roofed by baffles 103, see Fig. 2, which prevent the access of moisture from the drier cylinder to the contents of the roasting cylinders.

The rotary action of the cylinders and beaters may be produced in any suitable manner, the illustrated mechanism being as follows: The shafts and gears 9 and the motor 65 are shown at the rear but are preferably controlled from the front as hereinafter described, the details to be described and illustrated not being regarded as essential to the invention. The motor 65 drives a worm-wheel 66 by way of a worm 67 on the motor shaft. The worm-wheel 66 is mounted on and secured to a transverse shaft 68 which carries a bevelled gear 69 also secured to the shaft and meshing with a bevelled gear 70 on an upright shaft 71 mounted in bearings 72 which may be secured to the rear of the furnace. This upright shaft 71 carries above the bearing a second bevelled gear 73 which meshes with a bevelled gear 74 on the shaft 15 which carries the drier cylinder. The transverse horizontal shaft 68 which is mounted in bearings 75 on the frame carries at each end secured thereto a bevelled gear 77 each of which bevelled gears meshes with a bevelled gear 78, one on each of the shafts 16, each of which shafts 16 carries one of the respective roasting cylinders 2, 3.

By examination of Figure 4 it will be noted that in the form illustrated the connection between the bevelled gears 74 and 78, and the respective cylinder shafts 15 and 16 which they drive, is not permanent but is controlled by clutch mechanism; in other words, the hubs 79 of the gears 74 and the hubs 80 of the gears 78 each forms one member of an ordinary jaw clutch, the same being provided with clutch teeth 82, the gear being free to rotate relatively to the shaft 15 or 16 on which it is mounted and being prevented from sliding off the shaft by a suitable pin 83 or other means. The other clutch member 84 of each clutch is provided with clutch teeth 85 co-operating with the teeth 82 and such clutch member 84 comprising the sliding clutch member is keyed to its respective shaft by means of a key 86, so that each of the clutch members 84 is mounted to slide on the shaft and connected thereto to rotate therewith by the key 86. When any member 84 is slid forwardly away from the furnace, bringing the teeth into mesh with the corresponding teeth on the gear, the corresponding gear 74 and 78 is caused to rotate with the shaft, or more properly the shaft is caused to rotate with the gear, and when the members 84 are slid in the opposite direction, i. e., toward the furnace, the gears are disconnected and may rotate without actuating the corresponding shafts 15 and 16, and the corresponding cylinders 1, 2, 3. The clutch members are controlled in the form of the invention shown, each by jaw levers 88 connected to the sliding member 84, which member 84 may be in two halves as shown, having ears 89 and connected by bolts 90. The jaw levers 88 as shown are each in the form of a bell crank pivoted to a bracket on the furnace at 91 and having a forwardly projecting arm 92 connected by a connecting rod 93 to a similar bell crank 94 pivoted on the furnace at 95, which bell crank has its other arm 96 connected to a rod 97 which leads forwardly to the front of the furnace, the same being controlled at the forward end by a hand lever 98 pivoted at its bottom end at 99 to the furnace, see Figure 1, and connected intermediately to the aforementioned rod 97. This mechanism is repeated for the three cylinders and need not be individually described.

In the operation of the apparatus the peanuts impregnated with brine removed therefrom and suitably drained and separated from the brine by air blasts, are poured in at the hopper 34 and thus introduced into the drier cylinder 1 which is rotated by the mechanism described and heated by waste heat from the roasters 2 and 3, which if the operation of the plant is just beginning, may or may not contain peanuts being roasted. The peanuts then supplied are given about forty minutes of treatment in the drier or any suitable period found to be satisfactory, the drier being rotated to agitate the peanuts and the hot air from the roasters being drawn through the drier which is perforated, the draft being created by the fan 58 or in any suitable manner, the natural draft due to the heat of the furnace being utilized if desired. In the course of drying the water given out by the peanuts is evaporated and a considerable amount of salt deposited in the drier. When the drying operation is completed, the valve 42 at the end is opened and the cylinders 2 and 3 are filled in turn, the respective passages 36 being controlled by the damper 39 permitting the product to flow to first one and then the other of the cylinders 2 and 3. The drier cylinder 1 may be then refilled, and the roasting and drying operation continued.

A considerable amount of dust is given off by the peanuts during roasting. The dust from the roasters is removed at intervals or continually by way of the pipes 54 which may be controlled by dampers 100. From time to time the operation is discontinued and the salt removed from the drier which is preferably of thin perforated sheet iron, by beating on the metal with mallets or in any suitable manner, and if it is found necessary, the cylinder may be removed for this purpose by taking off the front or rear cover plates 21, 22 or both. During roasting as in drying the peanuts are agitated by the action of the paddles and vanes or ribs.

The apparatus described greatly increases the efficiency of the operation of roasting peanuts which are salted by impregnating them when in the shell with brine, as the peanuts, even when treated to the best advantage in the brine tank and blown free of the brine and fully drained, carry a great deal of moisture and salt, which interferes with the action of the roasters by filling them with moisture and causing the accumulation of salt therein, which moisture and salt are much more easily handled in the perforated drier where the moisture is drained and largely eliminated by evaporation by the waste heat from the roasters. The manner of treatment described conserves time and heat, and gives increased capacity of the plant and a product of the best quality.

I have thus described specifically and in detail a single embodiment of my invention in order that the nature and operation of the same may be clearly understood; however, the specific terms herein are used descriptively rather than in a limiting sense, the scope of the invention being defined in the claims.

What I claim and desire to secure by Letters Patent is:

1. The combination in an apparatus for drying and roasting peanuts impregnated with brine in the shell, comprising a drying cylinder with means for draining the same, a roasting cylinder below the drying cylinder, means below the roasting cylinder for heating the roasting cylinder, means for agitating the contents of the cylinder, the cylinders being offset to prevent access of water from the upper to the lower cylinder.

2. The combination in an apparatus for drying and roasting peanuts impregnated with brine in the shell, comprising a perforated rotary drying cylinder, a plurality of rotating roasting cylinders below the drying cylinder, means below the roasting cylinder for heating the roasting cylinders, and furnace walls enclosing the cylinders, the drying cylinder being heated by the waste heat from the roasting cylinders.

3. The combination in an apparatus for drying and roasting peanuts impregnated with brine in the shell, comprising a perforated rotary drying cylinder, a plurality of rotating roasting cylinders below the drying cylinder, means below the roasting cylinder for heating the roasting cylinders, and furnace walls enclosing the cylinders, the drying cylinder being heated by the waste heat from the roasting cylinders, the capacity of the two roasting cylinders combined being equal to that of the single drying cylinder.

4. The combination in an apparatus for drying and roasting peanuts impregnated with brine in the shell, comprising a perforated rotary drying cylinder, a plurality of rotating roasting cylinders below the drying cylinder, means for heating the roasting cylinders, the drying cylinder being heated by the waste heat from the roasting cylinder, furnace walls enclosing the cylinders, a stack and a fan therein, and dust pipes leading from the various cylinders to the stack.

5. The combination in an apparatus for drying and roasting peanuts impregnated with brine in the shell comprising a drying cylinder and a roasting cylinder, means for heating the roasting cylinder, the drying cylinder being above the roasting cylinder and heated by the waste heat therefrom, a furnace structure enclosing the cylinders having front and rear walls opposite the ends of the cylinders, the front end of each cylinder being in close contact with the front wall of the furnace and being closed thereby, a filler opening entering the front wall of the furnace and leading to the drier cylinder, and a passage leading from the drier cylinder to and through the portion of the front wall of the furnace opposite the roasting cylinder, and means for controlling and opening and closing said latter passage, and means for rotating the cylinders.

6. The combination in an apparatus for drying and roasting peanuts impregnated with brine in the shell comprising a drying cylinder, a roasting cylinder below the drying cylinder, furnace walls enclosing the cylinders, means supplying heat beneath the roasting cylinder, means for rotating the cylinders, each said cylinder comprising a tubular member open at the front and closed by contact with the front of the furnace, the furnace having openings at the front directly opposite each cylinder, each a little larger than the cross-section of the corresponding cylinder, a cover plate for each opening, means securing the same to the furnace, the cover plate corresponding to the drier cylinder having a filler opening at the top and a passage at the bottom leading downwardly toward the roasting cylinder, the cover plate opposite the roasting cylinder having an inlet opening at the top, means connecting the opening with said passage and a delivery opening at the bottom of the roasting cylinder plate.

7. The combination in an apparatus for drying and roasting peanuts impregnated with brine in the shell, comprising a drying cylinder having drainage openings, a plurality of roasting cylinders below the drying cylinder, each of one half the capacity of the drying cylinder, means for rotating the cylinders, heating means beneath the roasting cylinders, the drying cylinder being heated from the roasting cylinder, furnace walls enclosing the cylinders, each of said cylinders comprising a tubular member open at the front, the front ends of the cylinders being closed by contact with the furnace wall, the furnace walls having at the front a hopper opening leading to the drier cylinder and a discharge opening leading from the drier cylinder, the roasting cylinders likewise having each a feed opening connected to the said discharge opening, the front wall having a discharge opening opposite the lower portion of the end of each roaster cylinder.

8. The combination in an apparatus for drying and roasting peanuts impregnated with brine in the shell, comprising a drying cylinder having drainage openings, a plurality of roasting cylinders below the drying cylinder, heating means for the same, a shaft carrying each said cylinders, means for rotating the cylinders, heating means beneath the roasting cylinders, furnace walls enclosing the cylinders, each of said cylinders comprising a tubular member opening at the front, the front ends of the cylinders being closed by contact with the furnace wall, the furnace wall having at the front a hopper opening leading to the drier cylinder and a discharge opening leading from the drier cylinder, the roasting cylinders likewise having each a feed opening connected to the said discharge opening, and the front wall likewise having a discharge opening opposite the lower portion of the end of each roaster cylinder, the front wall of the furnace at the point engaged by the end of each said cylinder also having a vent opening, a stack with draft-creating means and pipes leading from each said vent opening to the stack.

9. The combination in an apparatus for drying and roasting peanuts impregnated with brine in the shell, comprising a drying cylinder having drainage openings, a plurality of roasting cylinders below the drying cylinder, a shaft carrying each said cylinders, means for rotating the cylinders, heating means beneath the roasting cylinders, walls enclosing the cylinders, each of said cylinders comprising a tubular member open at the front, the front ends of the cylinders being closed by contact with the wall, the walls having an opening opposite the end of each cylinder and a cover plate for each said opening, each of said cover plates also having a vent opening, a stack and vent pipes leading from each vent opening to the stack.

10. The combination in an apparatus for drying and roasting peanuts impregnated with brine in the shell, comprising a drying cylinder having drainage openings, a plurality of roasting cylinders below the drying cylinder, a shaft carrying each said cylinders, means for rotating the cylinders, heating means beneath the roasting cylinders, walls enclosing the cylinders, each of said cylinders comprising a tubular member open at the front, the front ends of the cylinders being closed by contact with the wall, the walls having an opening opposite the end of each cylinder and a cover plate for each said opening, a shaft for each said cylinder, means for rotating the cylinders, cover plates at the rear corresponding to the front cover plates, a bearing for each said shaft in the corresponding cover plates, and means for adjusting the cover plates up and down to align the shafts, and means for controlling the rotation of the cylinders.

11. The combination with an apparatus for drying and roasting peanuts impregnated with brine in the shell, comprising a drying cylinder, a roasting cylinder below the drying cylinder, means below the roasting cylinder for heating the roasting cylinder, means for agitating the contents of the cylinders and baffles for preventing the access of moisture from the drying cylinder to the roasting cylinder, the drying cylinder being heated by the waste heat from the roasting cylinder.

Signed by me at Baltimore, Maryland, this 14th day of May, 1925.

HUNTINGTON D. SAWKINS.